Oct. 15, 1957     S. O. H. AHL     2,809,800
VALVE MECHANISM FOR NOZZLES OR SIMILAR TUBULAR MEMBERS
Filed Dec. 29, 1954
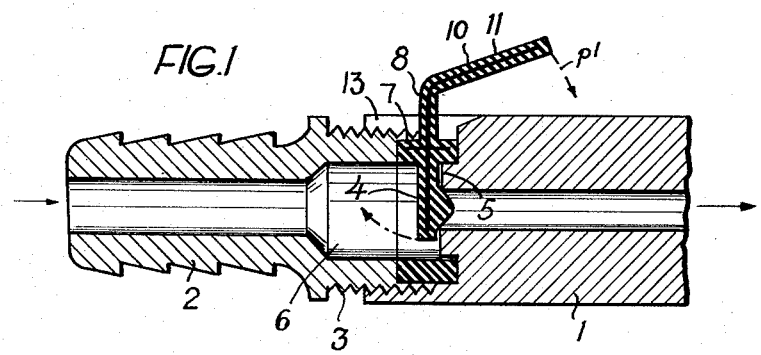
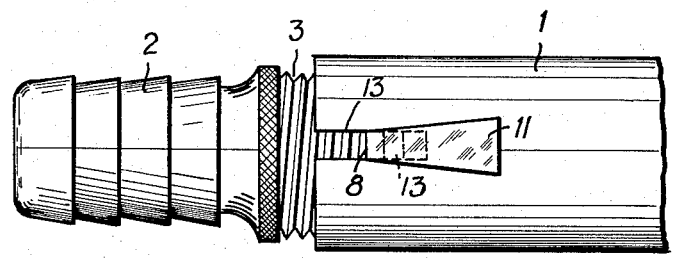
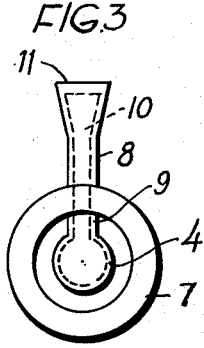
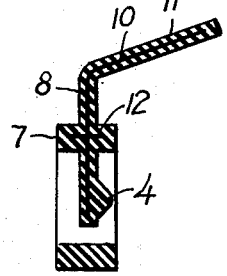

United States Patent Office 2,809,800
Patented Oct. 15, 1957

2,809,800

VALVE MECHANISM FOR NOZZLES OR SIMILAR TUBULAR MEMBERS

Sven Olov Hilding Ahl, Johanneshov, Sweden, assignor to Aktiebolaget Produktionsmateriel, Stockholm, Sweden, a corporation of Sweden Application December 29, 1954, Serial No. 478,273

4 Claims. (Cl. 251—148)

This invention relates to a valve mechanism for nozzles or similar tubular members having an internal valve seat and a cooperating valve member removable from said seat and preferably, but not necessarily, adapted to be moved into closing position substantially in the direction of flow of the fluid passing through the tubular member and controlled by the valve.

The object of the invention is to provide a valve mechanism of the kind referred to and arranged such as to prevent leakage of fluid from the interior of the tubular member to the outside thereof and to combine the valve member with an externally operable control handle constructed as a lever having its fulcrum constituted by a sealing member which replaces otherwise necessary links or similar members and packings or gaskets subject to wear.

The above object is attained by mechanism described below with reference to the accompanying drawing in which—

Fig. 1 is a longitudinal sectional view of a nozzle for a tube having a valve mechanism according to the invention; Fig. 2 a plan view as viewed from above in Fig. 1; Fig. 3 an elevation of the valve member and associated parts as viewed from the left in Fig. 1; and Fig. 4 a cross-sectional view of the valve member and associated parts. Referring to Figs. 1 and 2, reference numeral 1 denotes the rear part of a nozzle or sprayer and numeral 2 a connecting part for a hose, the parts 1 and 2 being threaded as at 3 and suitably screwed together and may alternatively be considered as parts of any conduit or pipe whatsoever. The valve member is indicated at 4 and the appertaining valve seat at 5, said valve member having a conical projection which in the closed position of the valve enters the opening of the nozzle 1. The direction of flow of the fluid passing through the nozzle is indicated by arrows. It will be seen that the valve member is removed from its seat in a direction opposite to the direction of flow and that the valve member will be kept in closing position in form engagement with the valve seat due to the pressure of the fluid.

Leakage of fluid from the space 6 outwards through the joint between the parts 1 and 2 is prevented by a sealing member 7 tightly clamped between opposite faces of the parts 1 and 2, said sealing member consisting of rubber, plastic or a similar material which upon being subject to deformation is able due to its elasticity to resume its original shape.

To remove the valve member from the seat 5, there is provided a lever having an arm 8 extending radially outwards through an opening and an inwardly extending arm 9 connected to the valve member 4, both of said arms being integral with the sealing member 7 and the valve member and being reinforced by a strip 10 extending into the valve member.

The arm 8 has an elongated portion 11 constituting a control handle 11. When this handle is depressed in the direction of the arrow $p'$, the lever 8, 9 will be swung or turned accordingly, the sealing member 7 then being resiliently deformed and serving as a fulcrum for the lever. The valve member 4 will consequently uncover the passageway of the nozzle as long as the handle 11 is depressed. When the handle is released, the lever 8, 9 and the valve member 4 will be returned to their original positions under the action of the tension of the deformed elastic member 7, until the valve member engages the valve seat. The pressure of the fluid then contributes to keep the valve member in firm engagement with the seat.

From Fig. 3 it will be seen that the elastic sealing member 7 is annular in accordance with the cooperating annular clamping faces of the parts 1 and 2. The members 4, 7, 8, 9, 11 consist of the same material and constitute a single piece having the reinforcing strip 10 embedded therein. Said parts may be made of a non-corroding material. Since there are no movable parts for transmitting the movement of the handle to the valve member and since leakage can not occur during this movement, the inconveniences hitherto inherent to valve mechanism of the type in consideration are entirely eliminated by the construction according to the invention.

As shown in Figs. 1 and 4, the reinforcing member 10 may be combined with a transverse part 12 located within the sealing member 7 so as to increase the tensional stresses occurring in the elastic material upon depression of the handle 11.

The nozzle or sprayer 1 has a longitudinal groove or recess 13 serving as a guide for the arm 8.

What I claim is:

1. A valve mechanism for a nozzle or similar tubular member having an internal valve seat and two internal clamping faces and a substantially radial opening in its wall, comprising a valve member for said valve seat, a sealing member tightly inserted between said clamping faces to prevent leakage through said opening, a lever having an arm connected to said sealing member and extending outwards through said opening and an inwardly extending arm connecting said sealing member with said valve member, said sealing member, inwardly extending arm and valve member being constructed in one piece of elastic material, and said inwardly extending arm being reinforced by a member anchored in said sealing member and extending outwards therefrom, the elastic sealing member constituting a fulcrum for said lever to pivot the valve member from the valve seat upon swinging movement of the lever.

2. A valve mechanism as set forth in claim 1 and wherein said tubular member consists of two parts screwed together, each part being formed with one of said clamping faces which are also annular, and wherein said sealing member is annular and constitutes a gasket between said two parts and defines a portion of the flow path.

3. A valve mechanism as set forth in claim 1 and wherein said arm extending outwards through said opening is provided with a coating of elastic material in one piece with the material forming the sealing member.

4. A valve mechanism as set forth in claim 1 and wherein the sealing member is constructed and arranged to normally hold the valve member in closed position against the valve seat.

References Cited in the file of this patent

UNITED STATES PATENTS

| | | |
|---|---|---|
| 2,313,128 | Densten | Mar. 9, 1943 |
| 2,488,380 | Danks | Nov. 15, 1949 |
| 2,539,559 | Ward | Jan. 30, 1951 |
| 2,757,688 | Klinger | Aug. 7, 1956 |